United States Patent [19]

Potage et al.

[11] Patent Number: 4,541,101
[45] Date of Patent: Sep. 10, 1985

[54] PROCESS AND DEVICE FOR VOICE INTERPOLATION IN A TRANSMISSION SYSTEM FOR DIGITIZED VOICE

[75] Inventors: Jean Potage, Franconville; Philippe Sidin, Paris, both of France

[73] Assignee: Thomson CSF, Paris, France

[21] Appl. No.: 565,715

[22] Filed: Dec. 27, 1983

[30] Foreign Application Priority Data

Dec. 28, 1982 [FR] France ................................ 82 21875

[51] Int. Cl.³ ........................ H04B 12/04; H04B 1/10; H04L 27/14; H04L 25/16
[52] U.S. Cl. ........................................ 375/28; 375/88; 375/102; 375/104; 455/213; 455/222
[58] Field of Search ................ 455/212, 213, 222–225, 455/304; 375/99, 102, 103, 104, 28, 88; 328/167

[56] References Cited

U.S. PATENT DOCUMENTS

| | | | |
|---|---|---|---|
| 2,395,737 | 2/1946 | Hansell | 455/222 |
| 3,497,812 | 2/1970 | Dixon | 375/104 |
| 4,304,004 | 12/1981 | Von der Neyen | 375/104 |
| 4,305,042 | 12/1981 | Tanaka et al. | 455/304 |
| 4,355,407 | 10/1982 | Mueller | 375/104 |
| 4,426,735 | 1/1984 | Kasperkovitz | 455/222 |

FOREIGN PATENT DOCUMENTS

| | | | |
|---|---|---|---|
| 2051891 | 7/1978 | Fed. Rep. of Germany | 455/224 |
| 0139417 | 10/1979 | Japan | 455/223 |
| 0007933 | 1/1983 | Japan | 455/223 |
| 2025176 | 1/1980 | United Kingdom | 375/102 |

Primary Examiner—Marc E. Bookbinder
Attorney, Agent, or Firm—Cushman, Darby & Cushman

[57] ABSTRACT

The interpolation device for the voice coded in DELTA transmission and transmitted on a fixed frequency or with frequency jumps carrier, comprises in parallel on a classic reception network, a jamming detection device being able to be constituted by a high-pass filter in order to detect the components outside the modulated signal band, a detector circuit with threshold fixing the level of the outside band components characterizing a jamming and possibly a monostable circuit. It comprises, furthermore, a rumbling generator that transmits to the input of the DELTA decoder a rumbling sequence in place of the sequence detected on a stage when this sequence is reckoned as jammed by means of a switch controlled by the output of the monostable circuit.

3 Claims, 2 Drawing Figures

4,541,101

PROCESS AND DEVICE FOR VOICE INTERPOLATION IN A TRANSMISSION SYSTEM FOR DIGITIZED VOICE

BACKGROUND OF THE INVENTION

The invention concerns the transmission of digitized vocal signals and, more particularly, a process, and a corresponding device, of vocal interpolation in a transmission system of digitized voice.

Numerous transmission needs of telephony by radio presently exist, both for civil and military applications. The tendency is to effect these transmissions under digital form, this type of transmission allowing to regenerate the signals, the coding, and also allowing a digital numbering or complex processing of the vocal signal.

In the ranges of frequencies used, VHF and UHF, vocal coding is of the DELTA type, i.e. a coding resulting in a differential quantification of the analogous signal on two levels giving direct rise to a digital message. Several variants of this coding are used; the output most commonly used being 16 kbits/sec.

In radio transmission, numerous phenomena can disturb the transmission. In classic radiotelephone type transmissions, the transmissions occur at fixed frequency and are subject to packs of errors or to pulse interferences, for example, those created by vehicle engines. In civil or military radiotelephone transmissions using the frequency jump, a group of frequencies is used, each of these frequencies acting as transmission support during a brief period of time called "stage". Certain "stages" can be disturbed or jammed by the unintentional or voluntary presence of other emissions on the corresponding frequency(ies).

In the presence of such disturbances, the DELTA coded vocal signal is restored with transitory phenomena which are most disagreeable for listening comfort and which render the transmission unintelligible when the occurence probability of these phenomena increases.

DESCRIPTION OF THE PRIOR ART

A device for the reduction of errors, in digital transmission, is described in British published patent application No. 2 025 176. This device comprises an error detector of code transmission in line that controls the transmission of a signal issuing from a pulse generator in place of the signal received in case of error detection.

SUMMARY OF THE INVENTION

The object of the present invention is detection of the presence of such disturbances and realisation of a suitable processing with a view to improving the listening comfort, at a given jamming probability or with a view to increasing the admissible rate of jamming, for a level of listening comfort judged acceptable by a detection device operating a detection of energy outside the modulation band of the signal.

According to the invention an interpolation process of he voice in a transmission system of digitized voice operating a prefiltered FSK narrow frequency band process, consists in the following:

detecting energy received outside the modulation band by a high-pass filtering having a cut-off frequency at least equal to the highest frequency of the prefiltered modulation band, in order to form a disturbance detection signal;

controlling by disturbance detection signal the transmission at the input of the voice decoding circuit either from the sequence of digital data received, or from a predetermined sequence allowing the suppression of the noise in the restored voice signal during disturbance.

The present invention also concerns the voice interpolation device operating this process.

BRIEF DESCRIPTION OF THE DRAWINGS

The invention will be better understood and other characteristics thereof will appear by reading through the following description which refers to the annexed drawings.

DESCRIPTION OF THE PREFERRED EMBODIMENT

In digital transmissions of radiophony, the type of modulation used is often a FSK frequency displacement modulation prefiltered at the emission in order to attenuate sudden transitions. Indeed, this type of modulation adds to the simplification an interesting property which is that of confining the spectrum within a narrow frequency band, this allows operating in adjacent frequency channels, which are only slightly separated in frequencies. In the presence of a LF signal of an output lower than or equal to 16 Kbits/sec, there is very little energy above a cut-off frequency being equal to about 1.3 times the output i.e. 20 kHz for an output of 16 Kbits/sec. On the other hand, in the presence of disturbances bound to jamming, the erratic behavior of the signal leads to rapid transitions and thereafter to components of frequencies higher than $f_c$.

In order to detect the presence of disturbances, the process according to the invention consists in detecting components outside the band of the useful signal, by a high-pass filtering of cut-off frequency $f_c$. When the disturbance has been detected, the processing realized in the device according to the invention consists in suppressing the noise by replacing this disturbance by a signal improving the listening comfort.

Figure 1:
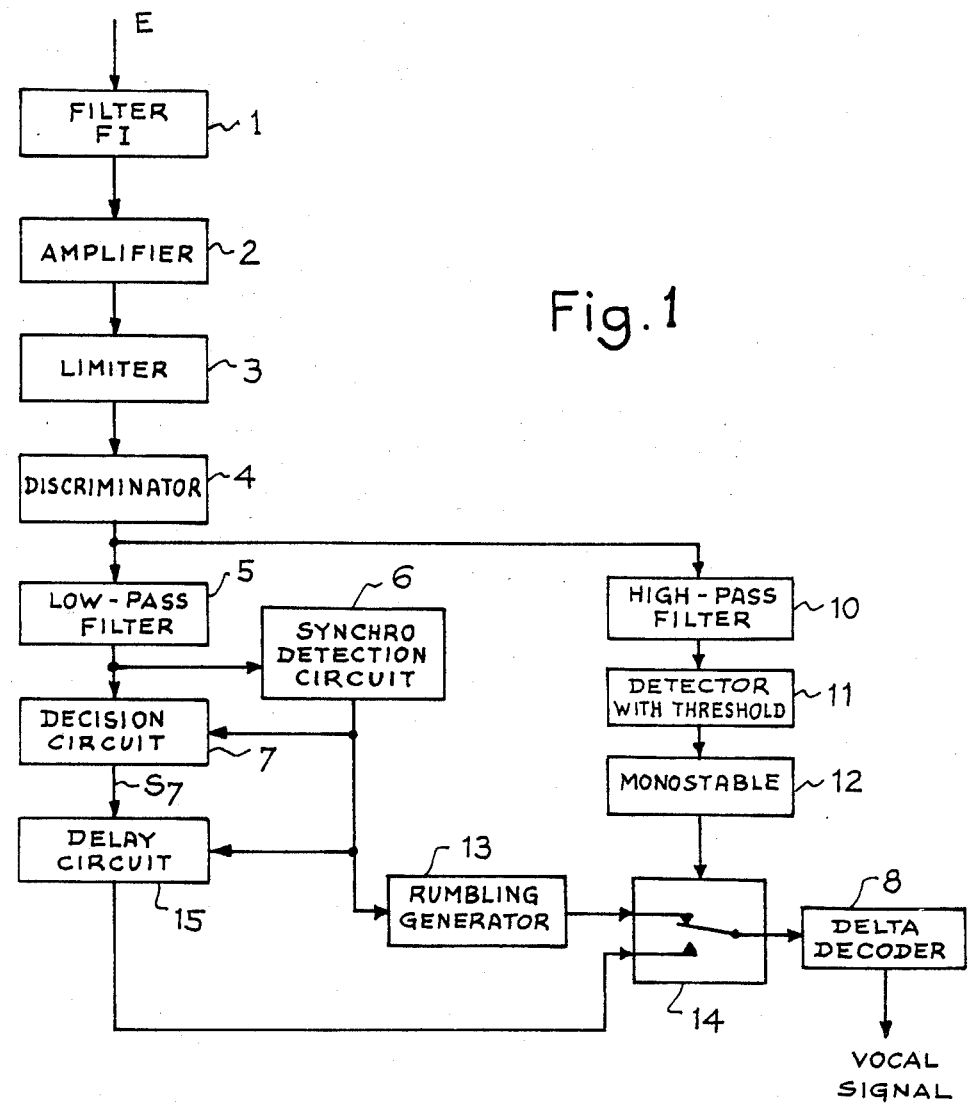
FIG. 1 is the schema of an embodiment of the voice interpolation device according to the invention.

The device according to the invention, described herein-after with reference to FIG. 1, comprises a classic network for reception and demodulation of a digitized voice signal coded in DELTA, and transmitted in prefiltered FSK modulation. Input E, that receives the intermediary frequency signal, is connected to the input of an intermediary frequency filter 1. The output of this filter is connected to an intermediary frequency amplifier 2 the output of which is connected to the input of a limiter 3. The output of the limiter is connected to the input of the frequency discriminator 4, in series with a low-pass smoothing filter the cut-off frequency of which is $f_c$. The output of this low-pass filter 5 is connected to the input of a circuit for detecting the bit synchronisation, this circuit detecting the passages by zero of the output signal of the low-pass filter 5. The output of this low-pass filter is also connected to the input of a sampling and decision circuit 7 having, furthermore, a sampling control circuit connected to the output of the circuit detecting the bit synchronisation 6. The circuit 7 gives the demodulated digital value of the binary element received. The output of the decision circuit 7 is connected to the input of a DELTA decoder 8 reconstituting, from the digital continuation at the output of the decision circuit 7, the vocal signal in analogous form.

In order to operate the process according to the invention, the vocal interpolation device comprises furthermore a high-pass filter 10, having a cut-off frequency $f_c$ equal to the cut-off frequency of the low-pass filter 5. In the absence of noise or jamming, the output signal of this filter is practically nil. This output signal increases in function of the noise level and, in particular, in case of jamming or noise peak. In this case a signal of significant level is present at the output of the high-pass filter 10. The output of this filter is connected to a threshold detector circuit 11, this threshold being the level from which it is considered there exists jamming. For example, this threshold can be the average level of an output signal corresponding to 8 decibels between the signal and the noise. The output of the threshold detector circuit 11 is connected to the input of a monostable circuit the output of which is connected to the control input of an ON/OFF switch 14. The monostable circuit acts to convert the output signal of the detector circuit to render it suitable to control the dispatcher.

The output of decision circuit 7 is connected to the input of the DELTA decoder through the intermediary of a delay circuit 15 and of the first channel of switch 14, first input-output, this output being connected to the input of the DELTA decoder 8. Delay circuit 15 has a clock input connected to the output of the detection circuit of bit synchronisation 6.

Delay circuit 15 allows to adjust the transit time in the demodulation channel to the duration necessary for the detection of disturbances, so that the detection of defects is well applied to the corresponding bits acknowledged as incorrect.

In the embodiment represented, the processing realized in order to suppress the noise during the disturbances consists in substituting the jammed bits transmitted in the reception network by a sequence of "rumblings" formed by an alternation of 0 and 1. In order to do this, the output of the detection circuit of bit synchronisation 6 is connected to the input of a rumbling generator circuit 13, the output of which is connected to the second input of switch 14. Thus, during detection of the disturbances, the jamming is replaced by a rumbling that is much acceptable to the ear. Indeed, experience has shown that the perception of disturbed voice during relatively long periods, 0.5 to 10 ms, for example, is only slightly affected by these disturbances if the noise during these periods can be suppressed, since the noise is perceptible and renders hearing disagreeable well before intelligibility is affected.

Figure 2:
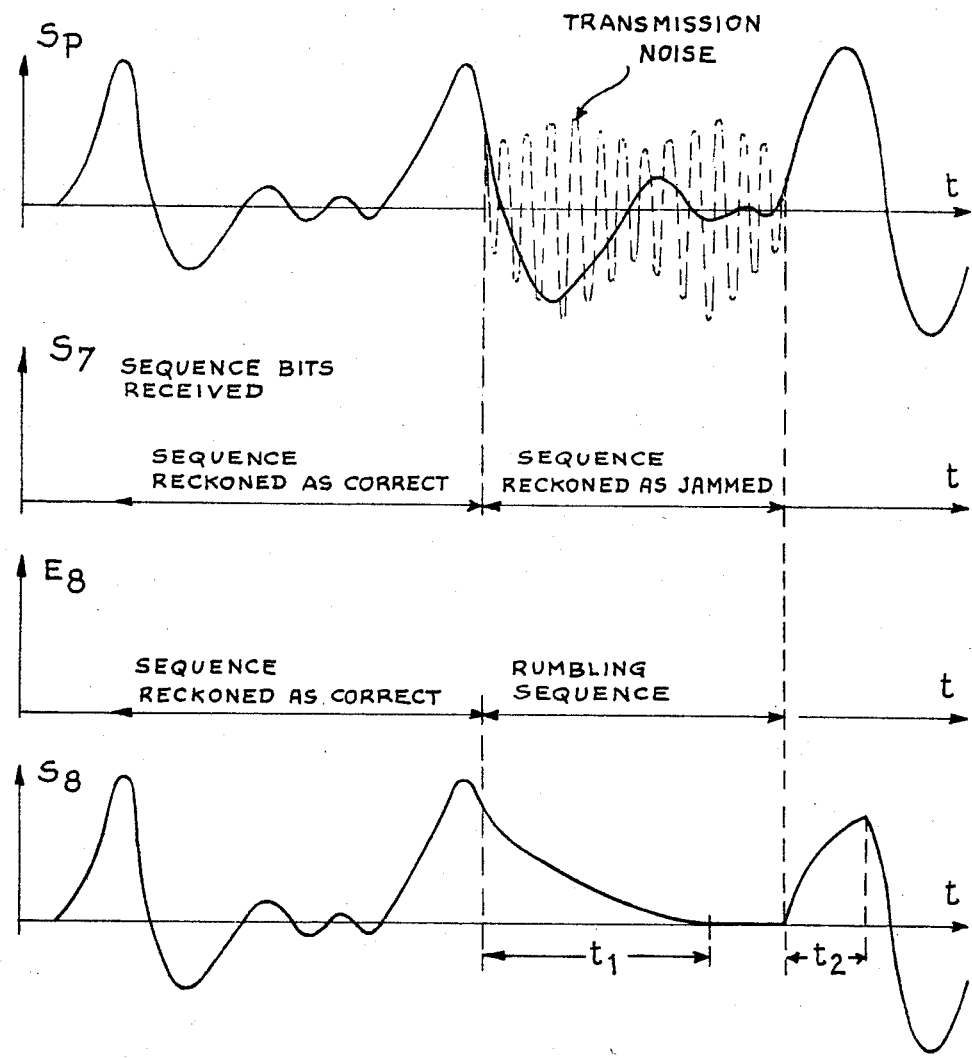
FIG. 2 is a diagram of signals illustrating the process according to the invention.

FIG. 2 is a diagram of signals that allows to explain this process.

The first signal represented by Sp is the analogous oral signal before coding and modulation.

On reception the modulated signal is processed by amplifier 2, limiter 3, discrimator 4 and low-pass filter 5. Processing in parallel by high-pass filter 10, and threshold detector 11, allows to determine whether the sequence of bits received is "reckoned as correct" or "as jammed".

The monostable circuit 12 that controls switch 14 associated with the rumbling generator 13, allows to replacement of the sequence of "reckoned as jammed" bits by a rumbling sequence. The signal at the input of the DELTA decoder 8 is thus constituted by a succession of sequences "reckoned as correct" or rumbling sequences.

At the output of the DELTA decoder, the coding being adaptative, the vocal signal from the level reached at the end of the sequence reckoned correct is progressively brought back to a nil signal. At the end of jamming, and when the monostable circuit has come back to its initial state, the vocal signal returns to its correct value without discontinuity.

This progressive variation does not introduce sudden phase variation. Indeed, from reception of a rumbling sequence 1, 0, 1, 0 ..., the DELTA decoder gradient is subjected to the minimal value since there is ony detection of successive 1 and 0. Due to this fact, whatever the amplitude of the signal prior to reception of the rumblings may be, the amplitude of the signal tends towards 0 with a time constant which is that of the adaptation loop of the DELTA decoder, i.e. about 4 ms. In the case of such a DELTA decoding, the rumbling generator 13 can be a simple D type flip-flop, the reversed output of which is connected to the signal input, the output of the detection circuit of the bit synchronization giving the clock rythm is connected to the clock input of flip-flop 13.

The invention is not limited to the embodiment described and represented herein-above. In particular, the description herein-above is illustrated by an example of a voice transmission system by radio. This example is not limitative and the interpolation device also applies to a transmission system by wires or radio links. This interpolation device is particularly suitable for transmission by packs, the jammed packs being replaced by rumbling sequences.

In the same way, the detection of jamming can be carried out differently and possibly result from the application of several distinct criteria.

In the case of digitized voice transmission by radio using for the transmission of digital data a modulation by frequency displacement prefiltered at the emission, the noise detection outside the useful band is particularly efficient, since at the emission there are no components emitted outside the useful band.

Furthermore, it is possible to decode the DELTA digitized signal in the ternary form in the following way. Decision on a given bit 1 takes into account the preceding bit, two successive "1" decoded "1", two "0" successively decoded "−1", the alternation of different successive bits decoded 0. The operating of the interpolation device is thus facilitated.

What is claimed is:

1. A process for voice interpolation in a transmission system of digitized voice data operating in a prefiltered FSK narrow band modulation process, comprising:
   providing disturbance corrupted FSK demodulated information corresponding to said digitized voice data;
   high-pass filtering said information with a cutoff frequency at least equal to the highest frequency of the prefiltered FSK modulation band in order to provide a disturbance detection signal;
   deriving digitized voice data from said information;
   generating a predetermined pulse sequence;
   decoding a digital signal to produce a restored, disturbance-free voice signal; and
   supplying selectively said digitized voice data or said predetermined pulse sequence as said digital signal such that the presence of said disturbance detection signal causes said pulse sequence to be substituted for said digitized voice data.

2. A device for voice interpolation in a transmission system of digitized voice data by radio using prefiltered FSK modulation, comprising a reception network, a demodulation circuit coupled to said reception network having a demodulated signal output and a decoding circuit, wherein said device comprises a disturbance detection circuit in order to detect at the output of the reception network the energy received outside the modulation band comprising a high-pass filter, having a cut-off frequency at least equal to the highest frequency of the prefiltered modulation band, a threshold detector circuit coupled to the output of said high-pass filter in order to provide a disturbance detection signal and wherein said device further comprises, coupled between the demodulated signal output and the input of the decoding circuit, a switch, a first input of which is connected to the demodulated signal output and an output of which is connected to the input of the decoding circuit, a predetermined pulse sequence generator, the output of which is connected to a second input of the switch, said switch having a control input for receiving the disturbance detection signal.

3. A device according to claim 2, wherein the digital voice data is coded according to a DELTA coding and the predetermined pulse sequence is a rumbling sequence consisting of an alternate 0 and 1 sequence.

* * * * *